US009578256B1

(12) United States Patent
Gregg

(10) Patent No.: US 9,578,256 B1
(45) Date of Patent: Feb. 21, 2017

(54) TEMPORARY INTERMEDIATE VIDEO CLIPS FOR VIDEO EDITING

(75) Inventor: John Gregg, Seattle, WA (US)

(73) Assignee: Google Inc., Mountain View, CA (US)

( * ) Notice: Subject to any disclaimer, the term of this patent is extended or adjusted under 35 U.S.C. 154(b) by 245 days.

(21) Appl. No.: 13/408,926

(22) Filed: Feb. 29, 2012

(51) Int. Cl.
*H04N 5/262* (2006.01)
*G11B 27/031* (2006.01)

(52) U.S. Cl.
CPC ........... *H04N 5/262* (2013.01); *G11B 27/031* (2013.01)

(58) Field of Classification Search
CPC .... H04N 5/262; G11B 27/031; G11B 27/032; G11B 27/034; G11B 27/036; G11B 27/038
USPC ........................................ 386/278, 281, 280
See application file for complete search history.

(56) References Cited

U.S. PATENT DOCUMENTS

| | | | | |
|---|---|---|---|---|
| 5,051,845 | A * | 9/1991 | Gardner et al. | 386/278 |
| 5,659,793 | A * | 8/1997 | Escobar et al. | 715/202 |
| 5,781,188 | A * | 7/1998 | Amiot | G11B 19/022 715/202 |
| 6,441,832 | B1 * | 8/2002 | Tao | G11B 27/031 715/723 |
| 6,771,285 | B1 * | 8/2004 | McGrath et al. | 715/723 |
| 7,287,226 | B2 * | 10/2007 | Maymudes | G06T 3/40 715/723 |
| 7,484,201 | B2 * | 1/2009 | Miyauchi et al. | 717/113 |
| 8,533,598 | B2 * | 9/2013 | Meaney | G11B 27/031 715/716 |
| 2001/0020953 | A1 * | 9/2001 | Moriwake | G11B 27/034 715/723 |
| 2002/0076198 | A1 * | 6/2002 | Savoie | 386/55 |
| 2003/0146915 | A1 * | 8/2003 | Brook | G11B 27/11 345/473 |
| 2005/0058430 | A1 * | 3/2005 | Nakamura | G11B 27/031 386/280 |
| 2007/0260968 | A1 * | 11/2007 | Howard | G11B 27/034 |
| 2007/0282898 | A1 * | 12/2007 | Stark | H04H 20/10 |
| 2008/0056663 | A1 * | 3/2008 | Tsujii et al. | 386/52 |
| 2009/0157731 | A1 * | 6/2009 | Zigler et al. | 707/102 |
| 2009/0226149 | A1 * | 9/2009 | Shibata et al. | 386/95 |
| 2010/0095333 | A1 * | 4/2010 | Kelly et al. | 725/100 |
| 2012/0192225 | A1 * | 7/2012 | Harwell | H04N 21/2668 725/34 |
| 2013/0124999 | A1 * | 5/2013 | Agnoli et al. | 715/723 |

FOREIGN PATENT DOCUMENTS

EP        0564247 A1 *  6/1993

* cited by examiner

*Primary Examiner* — David Harvey
(74) *Attorney, Agent, or Firm* — Fenwick & West LLP

(57) ABSTRACT

Systems and methods for building video sequences using intermediate videos are provided. In one or more embodiments, an intermediate video can be specified in a linear editlist-style video editing system and assigned an identifier. An editlist builder included in the video editing system can then be used to define a video sequence that includes a reference to all or a portion of the intermediate video. The intermediate video can be referenced as many times as needed within a given video sequence. The video editing system can also allow effects or other video processing operations to be applied to the intermediate video independently of the video sequence definition.

14 Claims, 12 Drawing Sheets

TEMPORARY INTERMEDIATE VIDEO CLIPS FOR VIDEO EDITING

TECHNICAL FIELD

This disclosure generally relates to video technology, and specifically to video editing using intermediate video referencing.

BACKGROUND

Linear video editing systems allow clients to combine multiple videos into a single video presentation. Using such video editing systems, a user can specify video clips to be joined in a sequence, such that the resulting sequence plays the specified video clips in a defined order. Video clips can also be selected for simultaneous playback using such systems, e.g., as a split-screen or picture-in-picture presentation.

In addition to sequencing videos, some video editing systems allow effects or other video processing operations to be applied to the video sequence. Such effects can include, but are not limited to, cross-fading, stabilization, image rotation, contrast or color adjustments, or other such video processing operations. Some effects can be applied in a frame-wise manner. That is, the effects are applicable to a single frame or a range of frames, and can be applied in a frame-by-frame manner. Such frame-wise effects can include, for example, contrast or color adjustments. Other effects must be applied to a multi-frame video segment as a whole. For example, a stabilization operation, which smoothes video motion by reducing the effects of camera shake, may analyze an entire video segment so that suitable stabilization algorithm can be performed on the moving image (e.g., by applying a motion averaging algorithm over the video segment).

Since some linear video editing systems only allow effects to be applied separately to each defined clip of a video sequence, problems can arise when applying certain effects to a video sequence comprising multiple video clips. For example, if the last half second of a first video is to be cross-faded with the first half second of a second video, and the second video is to be stabilized, it is necessary to apply the stabilization operation separately to (a) the cross-faded portion of the second video (i.e., the first defined video clip), and (b) the remaining portion of the second video after the cross-fade (i.e., the second defined video clip). Thus, rather than applying a seamless stabilization operation to the second video as a whole, it is necessary to segment the stabilization operation between two different sections of the second video—the section within the cross-fade and the section outside the cross-fade. This non-seamless stabilization can cause undesired video artifacts in the resulting video sequence.

Moreover, in some video sequencing applications, it is necessary to duplicate operations performed on a common video clip. For example, consider a video sequence to be created that demonstrates the effect of a particular video operation (e.g., a contrast increase). The sequence may comprise a side-by-side comparison of two video clips derived from the same source video, in which a contrast increase is applied to one of the video clips for comparison purposes. If another video operation (e.g., a rotate operation) is to be applied to both the left-side and right-side video clips, it is necessary to apply this common video operation separately to both video clips. This duplication of work can reduce processing speed and performance.

The above-described is merely intended to provide an overview of some of the challenges facing conventional systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of this disclosure relate to the use of intermediate videos to build video sequences in a linear video editing system. These intermediate videos can have a similar structure to video clips defined in a video sequence, but are not included in the sequence. Instead, video clip definitions within the sequence can reference the intermediate video by name (and, optionally, by time range) to thereby include the referenced intermediate video (or a portion thereof) in the sequence.

To this end, an intermediate video can be specified in a linear editlist-style video editing system and assigned an identifier. An editlist builder included in the video editing system can then be used to define a video sequence that includes a reference to all or a portion of the intermediate video, in addition to video clips specified directly in the sequence definition. The intermediate video can be referenced as many times as needed within a given video sequence. Additionally, the video editing system can allow effects or other video processing operations to be applied to the intermediate video as a whole, independently of the video sequence definition. In this way, stabilization operations or other such effects need not be applied in a segmented fashion within the video sequence definition. Moreover, effects that are applied to the intermediate video need not be duplicated within the video sequence definition.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
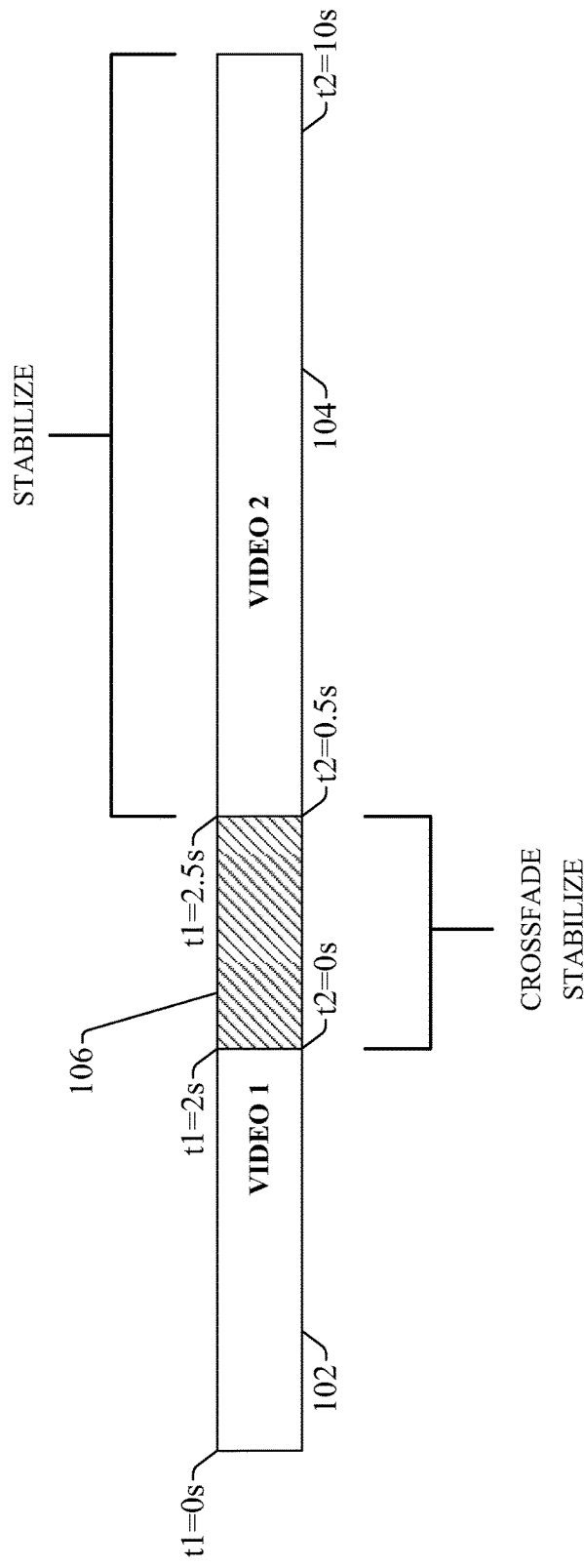
FIG. 1 illustrates an exemplary video editing operation performed without using intermediate videos.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Systems and methods described herein relate to the use of intermediate videos to create video sequences. Intermediate videos can be employed, for example, in linear video editing systems, including editlist-style video editing systems. Use of intermediate videos can reduce or mitigate undesirable video artifacts that may result from segmenting application of certain effects between different portions of a video, and/or can improve processing efficiency by reducing duplicated work, particularly duplication of effects processing.

To clarify some benefits of certain embodiments of this disclosure, FIG. 1 first illustrates an exemplary video editing operation performed without intermediate video referencing. In this example, Video 1 102 is to be cross-faded into Video 2 104, and Video 2 104 is to be stabilized. Video 1 102 is a 2.5 second video that runs from t1=0 s to t1=2.5 s. Video2 is a 10 second video that runs from t2=0 s to t2=10 s. The last 0.5 seconds of Video1 (t1=2 s–2.5 s) is to be cross-faded into the first 0.5 seconds of Video2 (t2=0 s–0.5 s). The shaded area 106 represents the cross-faded overlap between Video 1 102 and Video 2 104.

To implement this video editing operation without using an intermediate video, the following sequence can be defined in a linear editlist, where each numbered step in the video sequence definition represents a video clip definition:

Example Editlist 1:
Sequence:
1. Video1 [time 0.0 s–2.0 s]
2. Crossfade(from: Video1[time 2.0 s–2.5 s],
   to: Stabilize(Video2[time 0.0 s–0.5 s]))
3. Stabilize(Video2[0.5 s–10.0 s])

Since the cross-faded portion of Video2 (t2=0 s–0.5 s) must be defined as a separate video clip from the non-cross-faded portion of Video2 (t2=0.5 s–10 s), the stabilize operation must be applied separately to the two different portions (in clip 2 and clip 3, respectively). As illustrated in FIG. 1, Example Editlist 1 above applies both a cross-fade operation and a stabilize operation to the cross-faded segment (shaded area 106, corresponding to video clip 2 of the above sequence), and applies a second stabilize operation to the remainder of Video2 (corresponding to video clip 3 of the above sequence). Dividing the stabilize operation between two portions of Video2 in this manner may result in an undesired video artifact (e.g., a jump in the image) in the resulting video output, since the stabilize operation is not applied in a continuous manner across the entirety of Video 2 104. It is preferable to apply a single continuous stabilize operation across Video 2 104 as a whole to better ensure a seamless stabilization.

Figure 2:
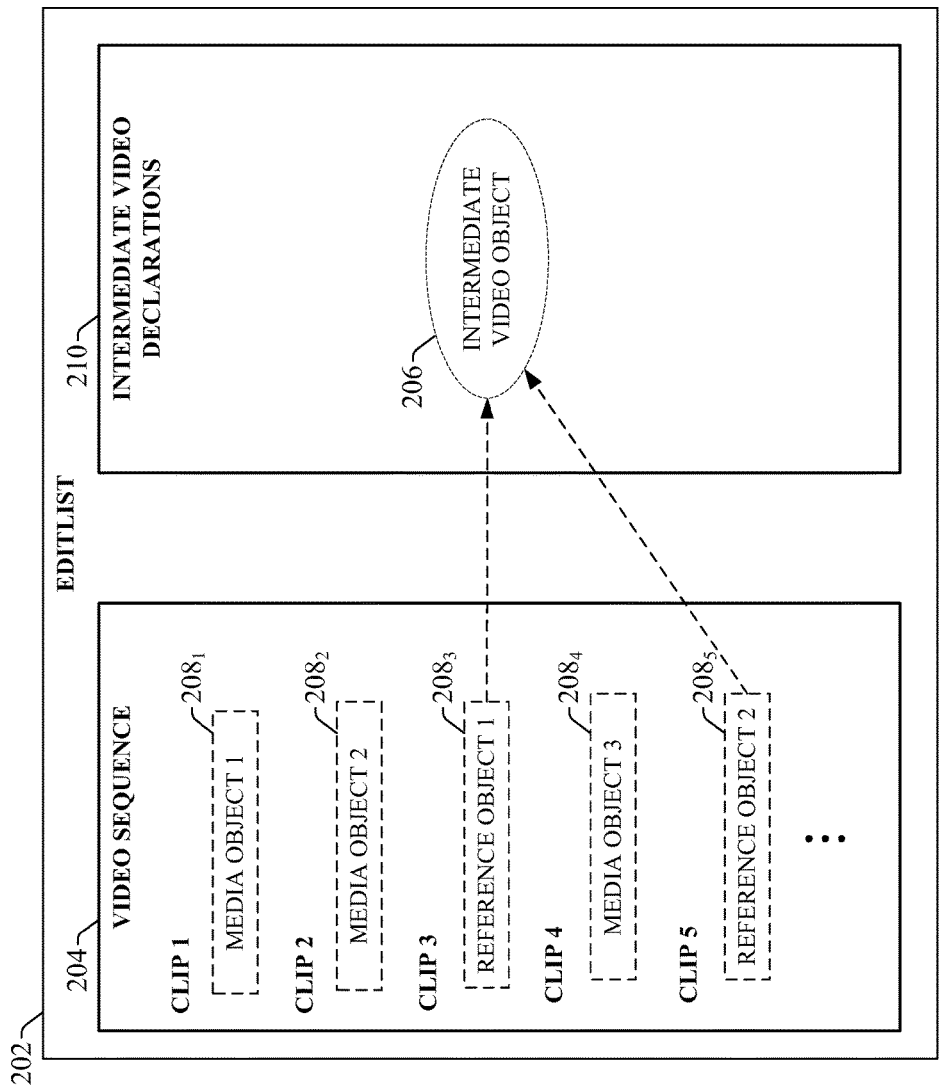
FIG. 2 illustrates an editlist created using such a video editing system.

To address these problems, one or more embodiments of this disclosure provide a video editing system that allows creation of intermediate videos in connection with defining a video sequence. FIG. 2 depicts an exemplary non-limiting editlist created using such a video editing system. Editlist 202 defines a video sequence 204 made up of video clips (clips 1-5). Each video clip can be specified as either a media object or a reference object. Media objects $208_1$, $208_2$, and $208_4$ can define video clips by specifying the source video and, optionally, the time range representing the portion of the source video to be included in the clip. In addition, video sequence 204 can specify one or more effects or other video processing operations to be applied to the respective media objects (e.g., stabilization, cross-fading, contrast adjustments, etc.).

In contrast to media objects $208_1$, $208_2$, and $208_4$, reference objects $208_3$ and $208_5$ define video clips by reference to an intermediate video object 206. Editlist 202 can define intermediate video object 206 separately from the video sequence 204, e.g., as one or more intermediate video declarations 210. Like media objects $208_1$, $208_2$, and $208_4$ defined in video sequence 204, intermediate video object 206 can specify a source video (or portion thereof). Additionally, intermediate video object 206 is given an associated identifier that can be referenced from the video sequence 204. In some embodiments, the identifier can be a character string that uniquely identifies the intermediate video object within the editlist. Reference objects $208_3$ and $208_5$ can refer to the intermediate video object 206 by calling this associated identifier. As a result, clips 3 and 5 of example video sequence 204 will include the source video represented by intermediate video object 206. Moreover, effects or other video processing operations can be applied to the source video, separately from video sequence 204 (e.g., as part of intermediate video declarations 210), to create the intermediate video object 206. For example, a stabilization operation can be applied to the entirety of a source video independently of video sequence 204, and the stabilized source video can be represented by intermediate video object 206. Thus, even if different portions of intermediate video object 206 are referenced in different video clip definitions of video sequence 204, a seamless stabilization of the source video represented by intermediate video object 206 can be assured. Encoding such effects in intermediate video object 206 separately from the video sequence 204 can thereby facilitate seamless application of effects and reduce redundancy of effects processing.

Although FIG. 2 depicts only one intermediate video object 206, it is to be understood that any number of intermediate video objects can be defined within editlist 202, each having a distinct identifier. Thus, multiple reference objects within video sequence 204 can refer to respective multiple intermediate video objects.

Figure 3:
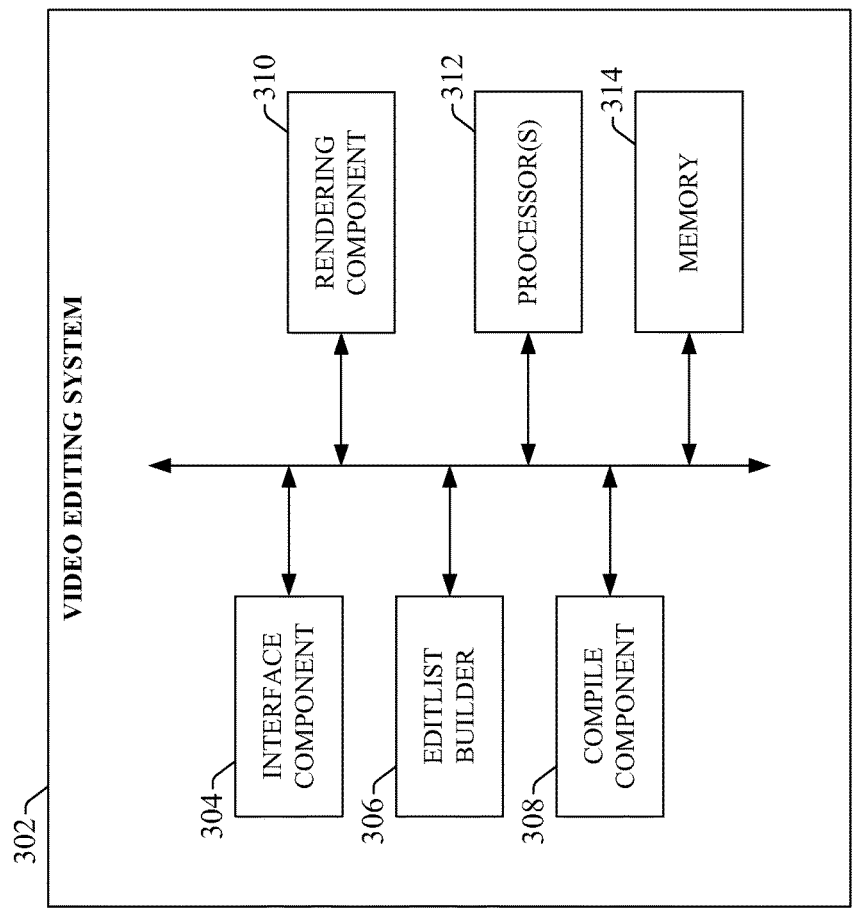
FIG. 3 illustrates a block diagram of an exemplary video editing system capable of creating editlists that use intermediate videos.

FIG. 3 is a block diagram of an exemplary non-limiting video editing system capable of creating editlists that use intermediate video referencing. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), virtual machine(s), etc., can cause the machine(s) to perform the operations described. Video editing system 302 can include an interface component 304, an editlist builder 306, a compile component 308, a rendering component 310, one or more processors 312, and memory 314. In various embodiments, one or more of the interface component 304, editlist builder 306, compile component 308, rendering component 310, the one or more processors 312, and memory 314 can be electrically and/or communicatively coupled to one another to perform one or more of the functions of the video editing system 302. In some embodiments, components 304, 306, 308, 310 can comprise software instructions stored on memory 314 and executed by processor(s) 312. The video editing system 302 may also interact with other hardware and/or software components not depicted in FIG. 3. For example, processor(s) 312 may interact with one or more external user interface device, such as a keyboard, a mouse, a display monitor, a touchscreen, or other such interface devices.

Interface component 304 can be configured to receive user input and to render output to the user in any suitable format (e.g., visual, audio, tactile, etc.). User input can be, for example, commands for constructing an editlist that defines a video sequence (e.g., as a linear sequence of video clip definitions). Editlist builder 306 can be configured to assemble an editlist in accordance with commands received via the interface component 304. According to certain embodiments, editlist builder 306 can create editlists that include one or more intermediate video definitions, as well as references to such intermediate videos within a video sequence definition, as will be described in more detail below. Compile component 308 can be configured to compile a completed editlist into a playable video sequence. Rendering component 310 can be configured to execute the compiled editlist to facilitate playback of the video sequence defined by the editlist. Rendering component 310 can display the video, for example, via interface component 304. The one or more processors 312 can perform one or more of the functions described herein with reference to the systems and/or methods disclosed. Memory 314 can be a computer-readable storage medium storing computer-executable instructions and/or information for performing the functions described herein with reference to the systems and/or methods disclosed.

Figure 4:
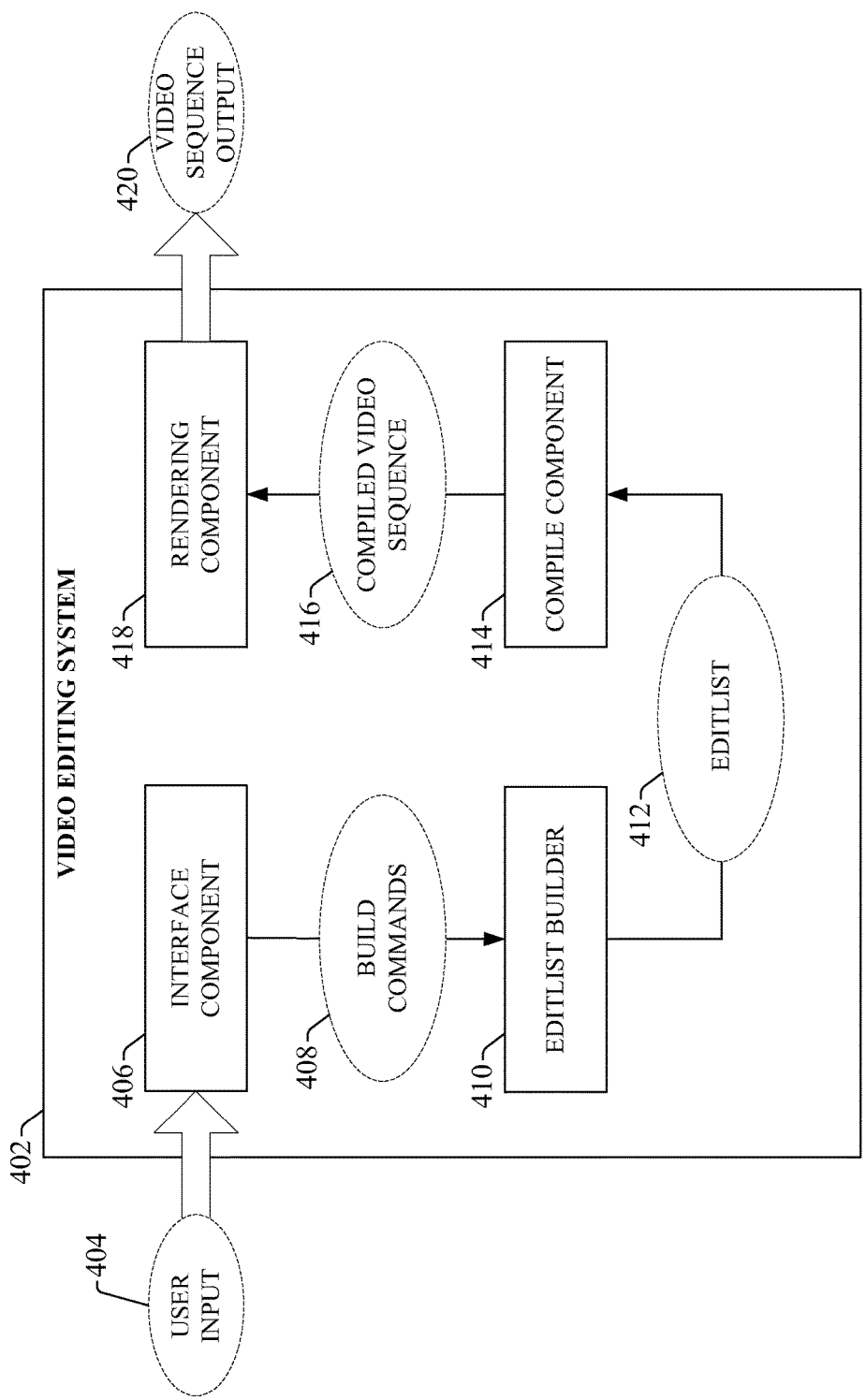
FIG. 4 illustrates generation of a video sequence output based on an editlist created in a video editing system that uses intermediate video referencing.

Characteristics of the video editing system are described in more detail with reference to FIG. 4. Interface component 406 of video editing system 402 receives user input 404. User input 404 can be, for example, user-provided instructions for creating a video sequence, which are translated into build commands 408. In one or more embodiments, interface component 406 can receive the instructions as text-based syntax conforming to a programming language understandable by editlist builder 410. Any programming language suitable for creating an editlist is within the scope of certain embodiments of this disclosure. Alternatively or in addition, interface component 406 can provide a graphical development environment, allowing editlists to be built through manipulation of graphical icons (e.g., by drag-and-drop manipulation). Also, according to certain embodiments, interface component 406 can provide an interactive interface that guides a user through the process of constructing a video sequence. For example, interface component 406 can display instructions that prompt the user to identify the video clips to be included in a video sequence, to specify an order in which the video clips are to be played in the sequence, and/or to specify any effects that are to be applied to the video clips. Interface component 406 can then translate the user input 404 provided by the user in response to these prompts into build commands 408.

Editlist builder 410 can process the build commands 408 received via interface component 406 to create an editlist 412. Editlist 412 defines a video sequence as a linear set of video clips. Each video clip in the editlist 412 can be defined by one or more media objects that specify respective source videos (or portions of source videos) to be included in the video clip, as well as any effects or other video processing operations to be performed on the video clip. A video clip can also be defined by a reference object that refers to an intermediate video defined in the editlist 412. Editlist 412 can also specify any effects that are to be applied to each video clip. Such effects can be applied independently to any of the media objects, the reference objects, or the intermediate video.

Compile component 414 compiles the editlist 412 generated by editlist builder 410 to yield a compiled video sequence 416 that can be executed to facilitate playback of the defined video sequence. The compiled video sequence 416 can be executed by rendering component 418 to generate a video sequence output 420 based on the definitions in the editlist 412.

Figure 5:
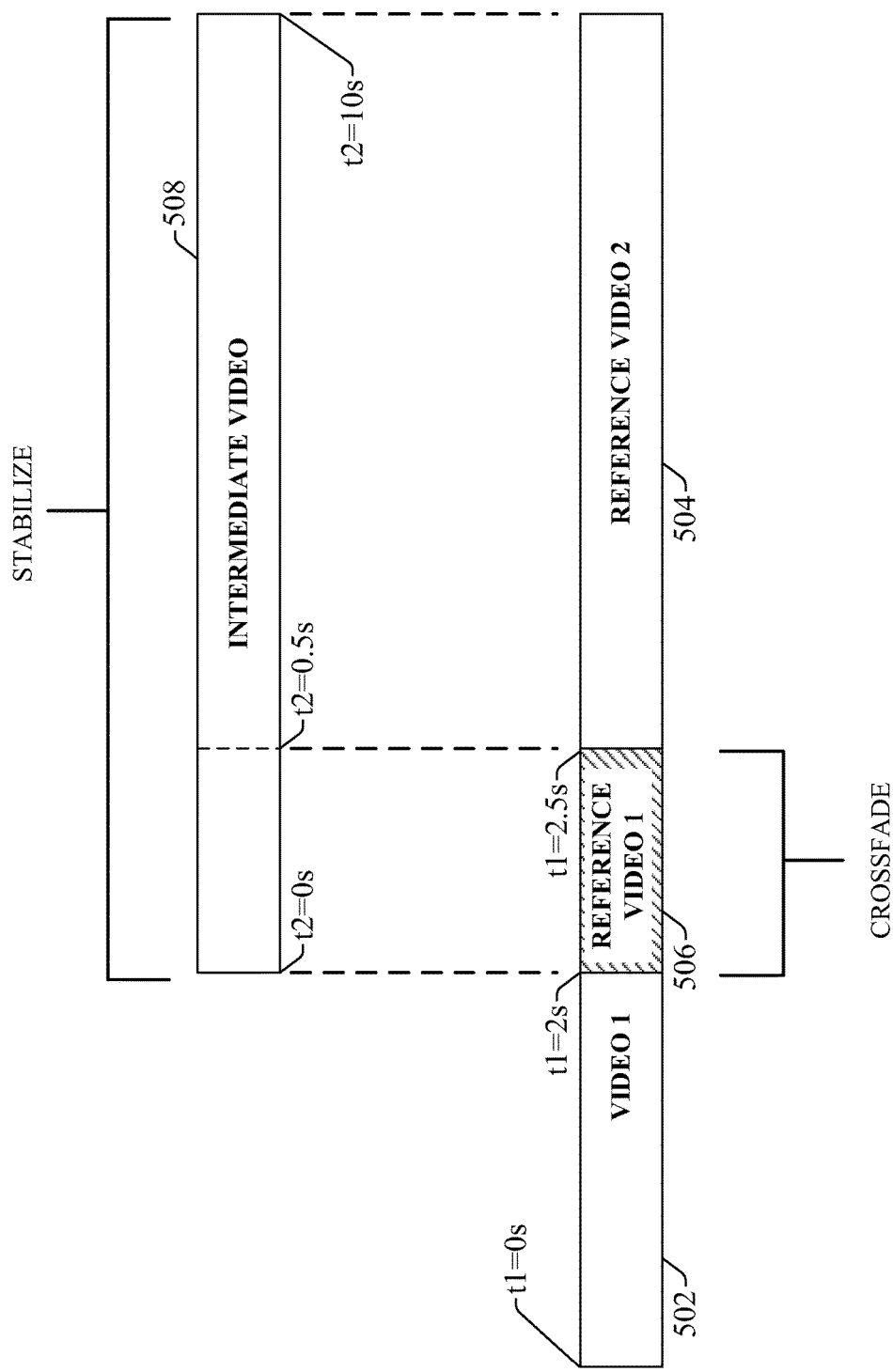
FIG. 5 illustrates an exemplary video editing operation performed using intermediate video referencing.

To demonstrate certain advantages of intermediate video referencing, FIG. 5 illustrates an exemplary video editing operation performed using intermediate video referencing in accordance with one or more embodiments of this disclosure. In particular, FIG. 5 depicts a cross-fading operation similar to that illustrated in FIG. 1. As in the previous example, the last 0.5 seconds of Video 1 502 (t1=2 s–2.5 s) is to be cross-faded into the first 0.5 seconds of a second video, and the second video is to be stabilized. In contrast to the example of FIG. 1, however, the editlist builder (e.g., editlist builder 410 of FIG. 4) can be used to declare an intermediate video 508 that specifies the second video as the source video. In one or more embodiments, the editlist builder can allow intermediate video 508 to be declared in the editlist separately from the video sequence definition and given a unique name that can be referenced from the video sequence definition.

In addition, the editlist builder can be used to apply any number of effects or other video processing operations to a source video to create the intermediate video 508, wherein the effects are applied separately from the video sequence definition. In the present example, a stabilize operation is applied to the second video to create intermediate video 508. Note that, in contrast to the cross-fade operation described in connection with FIG. 1, a single stabilize operation is applied to the entirety of the second video to yield intermediate video 508, rather than being applied in a segmented fashion within the sequence definition, thereby mitigating possible undesired video artifacts that can result when segmented, non-contiguous stabilize operations are applied.

To build the cross-faded video sequence using intermediate video 508, the first two seconds of Video 1 502 (t1=0 s–2 s) is defined as the first clip. The second clip—the cross-faded portion 506—can then be defined as a cross-fade between the last 0.5 seconds of Video 1 502 (t1=2 s–2.5 s) and the first 0.5 seconds of intermediate video 508 (t2=0 s–0.5 s). Since intermediate video 508 contains the results of stabilizing the second video in its entirety, the only operation that needs to be applied to the second clip of the sequence is the crossfade effect. Finally, the remainder of intermediate video 508 (t2=0.5 s–10 s) is defined as the third video clip 504 of the sequence. Again, since intermediate video 508 has already been stabilized, no additional stabilization operation need be applied to the third clip.

The video operation described above can be implemented using the following sequence defined in the editlist:

Example Editlist 2:
Intermediate Video Declaration:
Intermediate video "Stable": Stabilize(Video2[time 0.0 s–2.0 s])
Sequence:
1. Video1[time 0.0 s–2.0 s]
2. Crossfade (from: Video1[time 2.0 s–2.5 s],
   to: "Stable"[time 0.0 s–0.5 s])
3. "Stable"[0.5 s–10.0s]

This editlist syntax is only intended to be exemplary, and it is to be understood that any suitable syntax for building video sequences and defining intermediate videos is within the scope of certain embodiments of this disclosure. In this example, intermediate video 508 (specifying Video2 as the source video) has been declared separately from the main video sequence, and given the identifier "Stable." The intermediate video "Stable" has also been stabilized separately from the video sequence definition using a Stabilize function. The stabilized intermediate video "Stable" is then referenced from the sequence definition as needed. In this way, the stabilize operation is only performed once on Video2, rather than being performed as two separate operations within the sequence, as was the case in FIG. 1.

Figure 6:
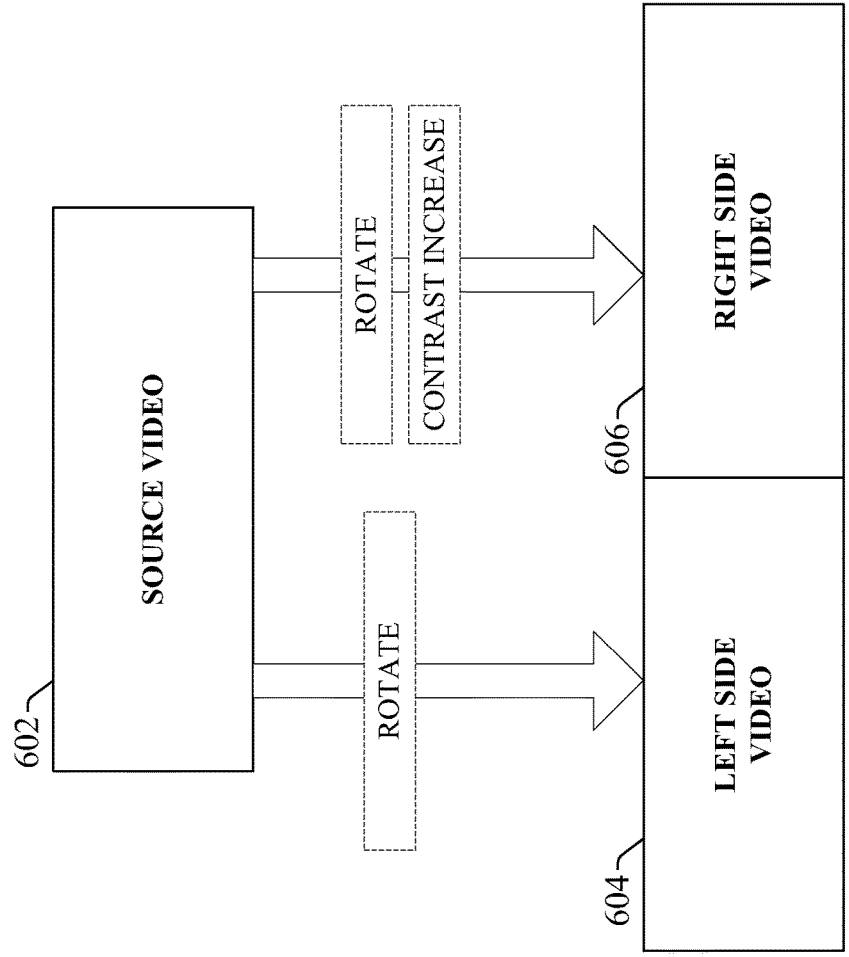
FIG. 6 illustrates creation of a side-by-side video presentation performed without intermediate video referencing.
Figure 7:
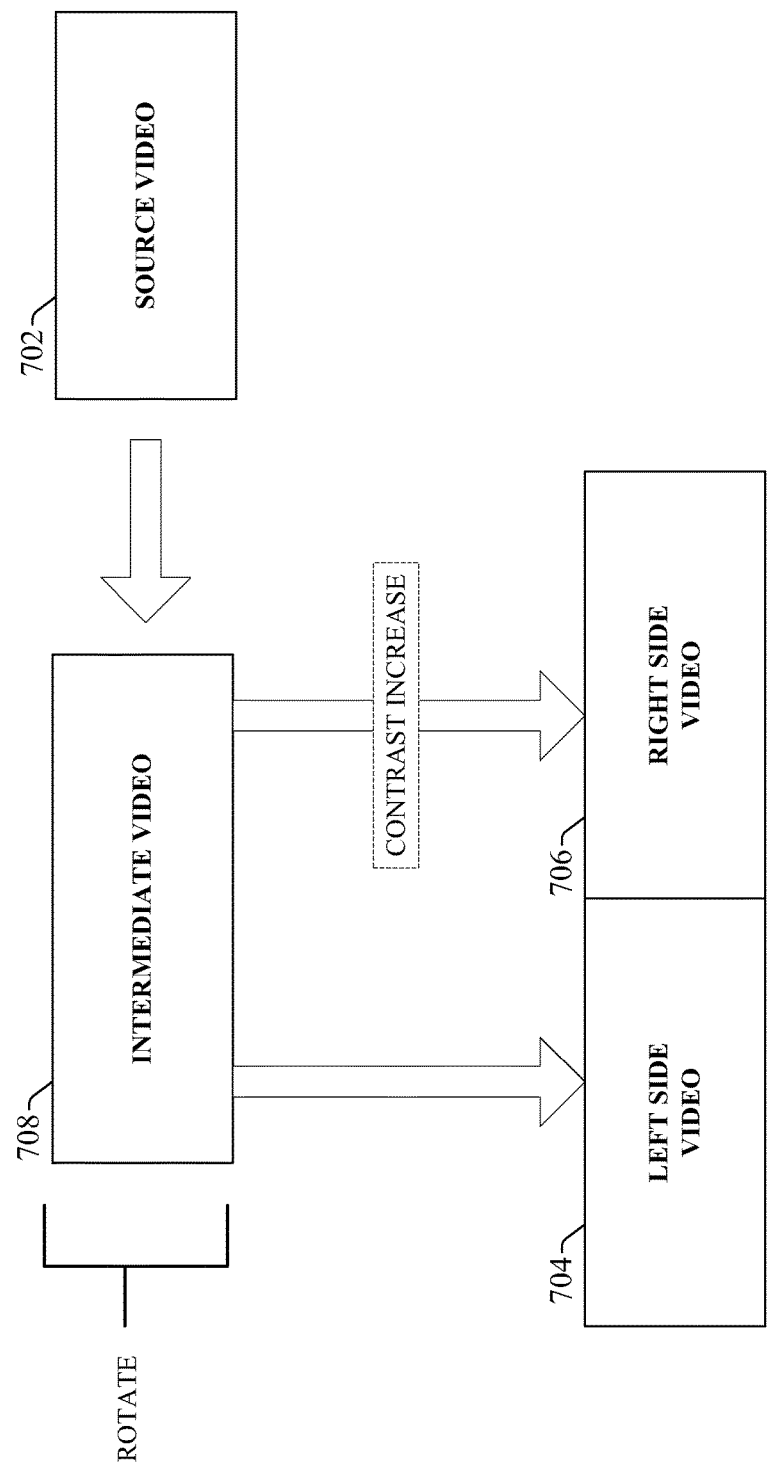
FIG. 7 illustrates creation of a side-by-side video presentation performed using intermediate video referencing.

FIGS. 6 and 7 illustrate another exemplary video editing operation. In this example, a user may wish to demonstrate the effects of a contrast adjustment by rendering a side-by-side presentation of two videos derived from a common source video, in which the contrast adjustment is applied to one of the two videos for comparison purposes. In addition, the source video is to be rotated prior to display for both the right-side and left-side presentations.

FIG. 6 illustrates this operation as performed without the use of an intermediate video. Source video 602 is used as the basis for a side-by-side presentation. A video sequence is to be built in which both the left side video 604 and the right side video 606 of the presentation are rotated versions of source video 602, and the right side video 606 additionally has a contrast increase applied. Without using an intermediate video, the following editilist sequence may be used to implement this operation:

Example Editlist 3:
Sequence:
1. Side-By-Side(left side: Rotate (SourceVideo),
   right side: Contrast(Rotate(SourceVideo)))

Note that the Rotate operation must be applied to both the right and left sides of the presentation, resulting in a duplication of work. If additional clips that require rotated versions of source video 602 are added to the sequence, the Rotate operation must be applied individually to each of those additional clips as well. This duplication of work can negatively impact processing performance when the sequence is compiled and executed for playback.

One or more embodiments of the video editing system described in this disclosure can mitigate such duplication of work by allowing creation of an intermediate video for the source video, as illustrated in FIG. 7. The editlist builder allows a developer to create intermediate video 708, which specifies source video 702 as the source. The developer can also assign a distinctive name to intermediate video 708 (e.g., "Rotated") which can be referenced from the sequence definition. A Rotate operation can be applied to the intermediate video 708 separately from the video sequence definition. This ensures that all references to intermediate video 708 within the video sequence will retrieve the rotated version of the video. Thus, the left side video 704 can be a reference to intermediate video 708 without additional processing, and the right side video 706 can be a reference to intermediate video 708 with only a contrast increase applied. The video sequence for this operation may be written as follows:

Example Editlist 4:
Intermediate Video Declaration:
Intermediate video "Rotated": Rotate(SourceVideo)
Sequence 1:
1. Side-By-Side(left side: "Rotated"),
   right side: Contrast("Rotated")

As shown in this sequence, the Rotate operation is performed only once—as part of the intermediate video declaration. The rotated intermediate video is then referenced within the sequence by its assigned identifier "Rotated."

Figure 8:
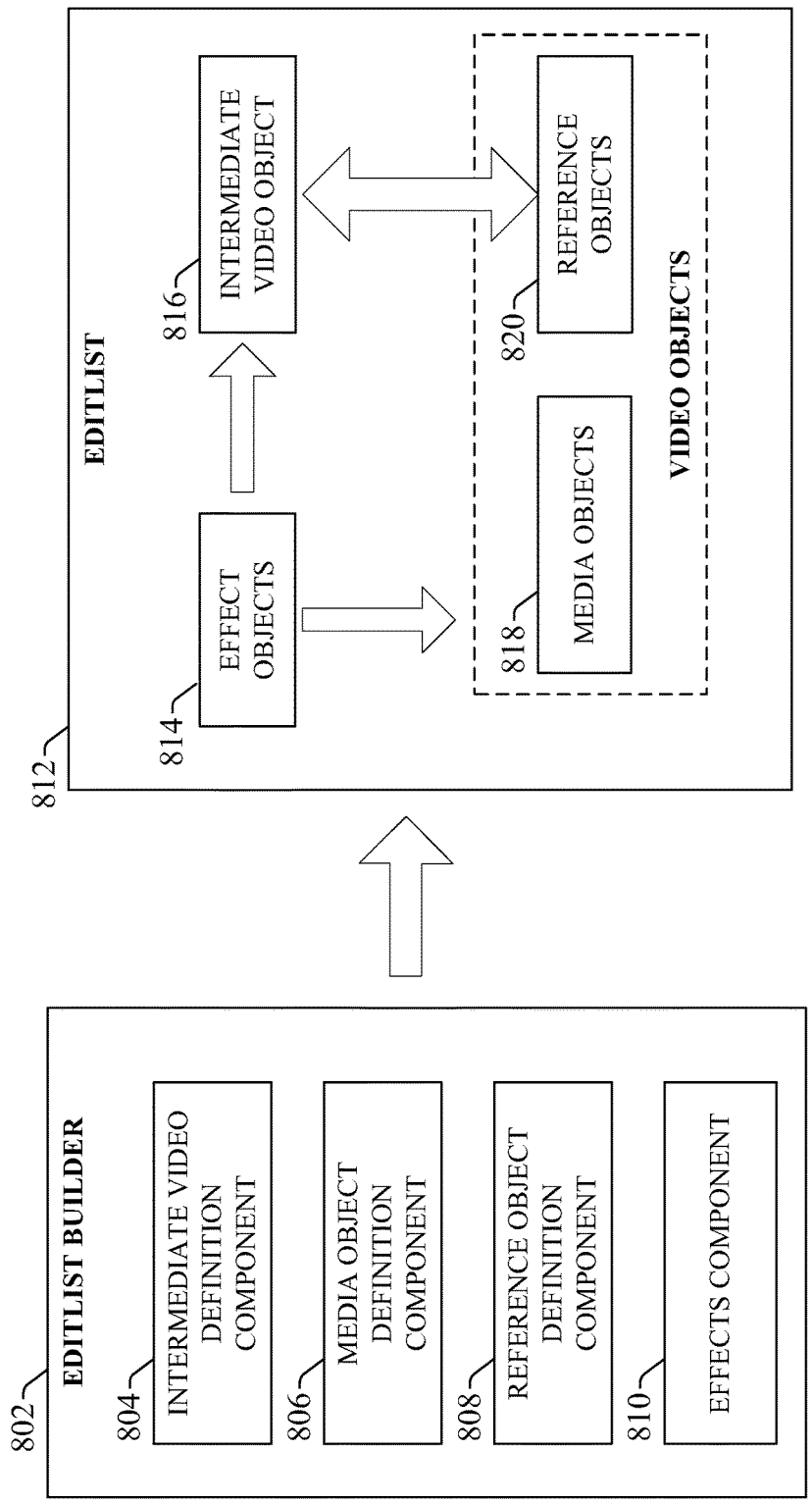
FIG. 8 is a block diagram of an exemplary editlist builder.

FIG. 8 illustrates an exemplary non-limiting editlist builder that can be used to create an editlist 812. Editlist builder 802 can be similar to editlist builder 306 of FIG. 3 and/or editlist builder 410 of FIG. 4, and may be included as part of a linear video editing system. The editlist builder 802 can build editlist 812 using one or more of an intermediate video object 816, video objects that specify source videos for inclusion in a video sequence (e.g., media objects 818 and reference objects 820), and effect objects 814 for applying effects or other video processing operations to the intermediate video object 816, the media objects 818, and/or the reference objects 820. The editlist 812 can define a video sequence made up of one or more of the media objects 818, the reference objects 820, and/or the effect objects 814, where the reference objects 820 point to at least a portion of intermediate video object 816.

Editlist builder 802 can include an intermediate video definition component 804 configured to define the intermediate video object 816 within editlist 812. Based on configuration input provided by a user, intermediate video definition component 804 can specify a source video to be associated with the intermediate video object, and can assign a unique identifier to the intermediate video object 816. The unique identifier assigned to intermediate video object 816 need only be unique within the scope of editlist 812. As described in the examples above, the unique identifier allows the intermediate video object 816 to be referenced by name from a video sequence defined in editlist 812, e.g., by reference objects 820. Intermediate video definition component 804 can create the intermediate video object 816 in accordance with user-provided instructions. For example, the intermediate video declarations of Example Editlists 2 and 4 above represent exemplary syntax that can be submitted to intermediate video definition component 804 to facilitate creation of intermediate video objects. However, any suitable syntax or programming language for declaring intermediate videos is within the scope of certain embodiments of this disclosure.

Media object definition component 806 can be configured to define media objects 818 as part of a video sequence. Media objects 818 specify source videos (or defined portions of such source videos) for inclusion as a video clip within the sequence. Video clip 1 of Example Editlist 2 above (Video1[time 0.0 s–2.0 s]) represents an exemplary media object definition specifying the first two seconds of Video 1.

Reference object definition component 808 can be configured to define reference objects 820 as part of the video sequence in accordance with user instructions. Similar to media objects 818, reference objects 820 specify a video to be included as a video clip in the video sequence. In contrast to media objects 818, however, reference objects 820 refer to intermediate video object 816 rather than to a source video directly. Reference objects 820 can refer to intermediate video object 816 by its unique identifier, and can specify either the entire intermediate video object 816 or a defined portion thereof (e.g., by specifying a time range or specific frame identifiers). Video clip 3 of Example Editlist 2 above ("Stable"[0.5 s–10.0 s]) represents an exemplary reference object definition that references the portion of intermediate video object "Stable" starting at 0.5 s and ending at 10.0 s. Such reference object definitions can be provided to reference object definition component 808, which can create instances of the reference objects 820 in accordance with the definitions. Editlist builder 802 can also allow a video clip to be defined that includes both a media object and a reference object. See, for example, video clip 2 of Example Editlist 2 above, which includes both a media object (Video1[time 2.0 s–2.5 s]) and a reference object ("Stable"[time 0.0 s–0.5 s]).

Effects component 810 can be configured to apply effect objects 814 to any of the intermediate video object 816, the media objects 818, or the reference objects 820. Effect objects 814 can represent any suitable effects or other video processing operations that can be applied to a video clip, including but not limited to contrast or color adjustments, stabilization, image rotation, cross-fading, auto leveling operations, noise reduction, and the like. If intermediate video object 816 includes an effect represented by one of the effect objects 814, any reference objects 820 that refer to the intermediate video object 816 will inherit the applied effect. The Crossfade, Stabilize, Rotate, and Contrast functions included in Example Editlists 1-4 above represent exemplary syntax that can be processed by effects component 810 to apply the corresponding effects to video clips or intermediate video objects. However, any suitable development syntax is within the scope of certain embodiments of this disclosure.

Figure 9:
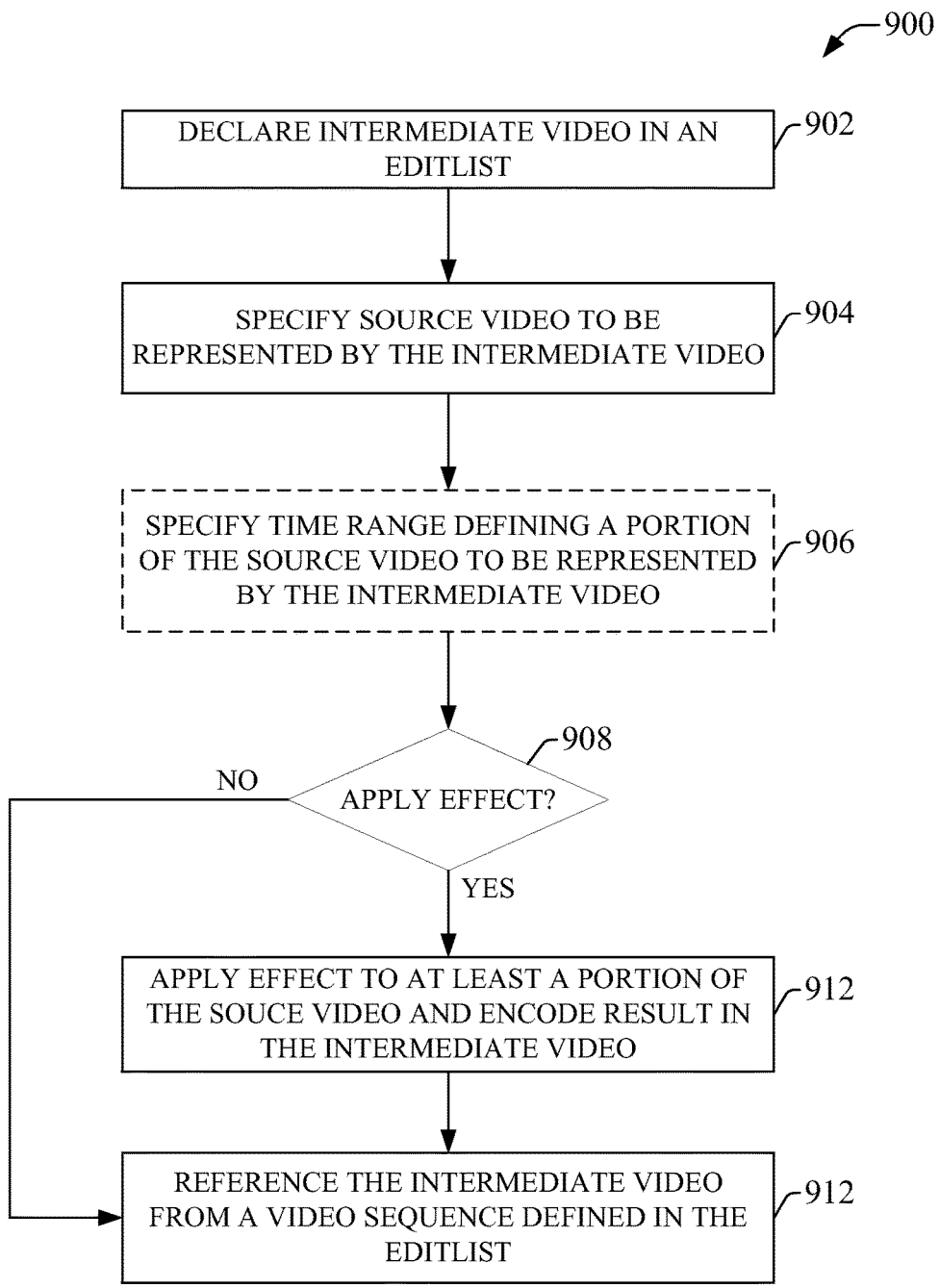
FIG. 9 is a flowchart of an example methodology for defining an intermediate video for use in a video sequence editlist.
Figure 10:
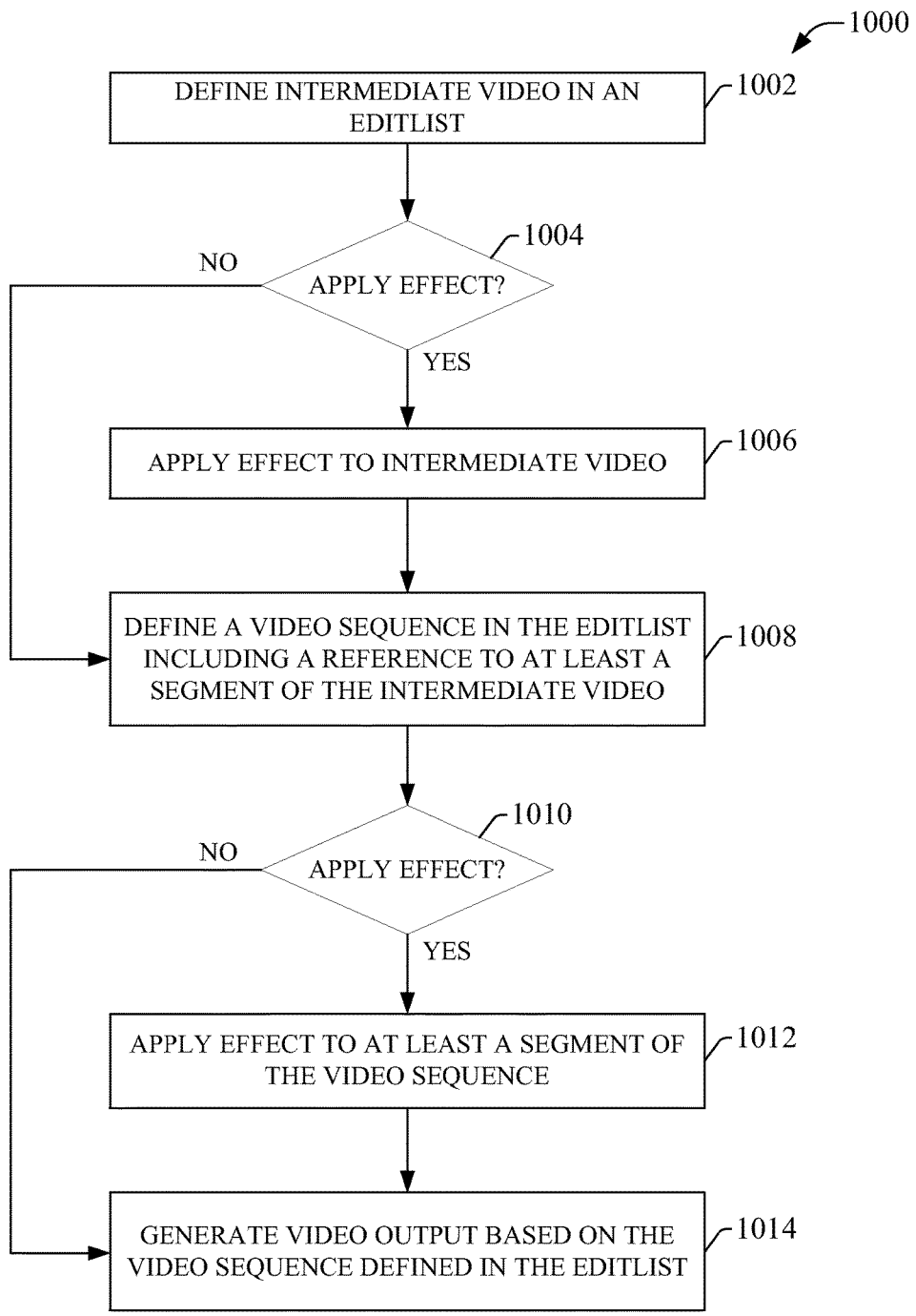
FIG. 10 is a flowchart of an example methodology for defining a video sequence using intermediate videos.

FIGS. 9-10 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 9 illustrates an example methodology 900 for defining an intermediate video for use in a video sequence editlist. In one or more embodiments, the editlist can be a text-based list of instructions defining a sequence of video clips and any associated effects or other video processing operations. However, graphics-based editlists are also within the scope of certain embodiments of this disclosure. The editlist can be created using a linear video editing system (e.g., video editing system 402 of FIG. 4), which can provide a development environment and associated user interface for creating such editlists.

At 902, an intermediate video is declared in the editlist (e.g., by intermediate video definition component 804 of FIG. 8). In one or more embodiments, the intermediate video is declared separately from the video sequence definition, but can be referenced from the video sequence within one or more video clip definitions.

At 904, a source video to be represented by the intermediate video is specified (e.g., by the intermediate video definition component 804). The source video can be any suitable video or set of video frames that are to be included in a video sequence defined in the editlist. In one or more embodiments, the source video can be identified by specifying a name of the source video. If only a portion of the source video is to be represented by the intermediate video, a time range or set of frame identifiers corresponding to the desired portion of the source video can optionally be defined for the intermediate video at step 906 (e.g., by the intermediate video definition component 804).

At 908, it is determined whether the intermediate video is to include an effect. If so, the method moves to step 910, where the effect is applied to at least a portion of the source video (e.g., by effects component 810) and the result is encoded in the intermediate video. Any suitable effect or video processing operation can be applied, including stabilization, auto leveling operations, contrast or color adjustments, image rotation, cross-fading, noise reductions, or the like. If no effect is to be applied (or after all desired effects have been applied), the methodology moves to step 912, where the intermediate video is referenced (e.g., by reference object definition component 808) from a video sequence defined in the editlist. For example, the intermediate video can be referenced from within a video clip definition in the video sequence, thereby specifying the source video represented by the intermediate video to be included in the video clip. The reference can specify the entire intermediate video for inclusion in the video clip or a defined segment of the intermediate video. In one or more embodiments, the segment can be specified by indicating a time range or by identifying specific frames of the intermediate video for inclusion in the sequence. If an effect was applied to the intermediate video at step 910, the effect will be included in the video clip by virtue of the reference.

FIG. 10 illustrates an example methodology 1000 for defining a video sequence using intermediate videos. At 1002, an intermediate video is defined in an editlist (e.g., by intermediate video definition component 804 of FIG. 8). The intermediate video definition can include an indication of the source video represented by the intermediate video, as well as a unique identifier that can be used for referencing.

At 1004, it is determined whether the intermediate video defined at step 1002 is to include an effect. If an effect is to be included, the method moves to step 1006, where the effect is applied to the source video (e.g., by effects component 810 of FIG. 8) to create the intermediate video.

If no effect is to be applied (or after all desired effects have been applied), the methodology moves to step 1008, where a video sequence is defined in the editlist (e.g., by editlist builder 802 of FIG. 8). In one or more embodiments, the video sequence is made up of a series of video clip definitions (which can be written, for example, in terms of media objects and reference objects) that specify the video clips to be included in the sequence. The video sequence can also define an order in which the video clips are to be rendered and specify any effects to be applied to the respective video clips. The editlist includes at least one reference to the intermediate video defined at step 1002. In this way, the intermediate video is included in the sequence by reference to the intermediate video's unique identifier. If one or more effects were applied to the intermediate video at step 1006, those effects are inherited by reference and included in the video sequence.

At 1010, it is determined whether an effect is to be applied to any portion of the video sequence. If an effect is to be applied, the methodology moves to step 1012, where the effect is applied (e.g., by effects component 810) to at least a segment of the video sequence. If the effect is applied to a segment of the video sequence corresponding to the intermediate video reference, the effect is applied in addition to any effects that were already applied to the intermediate video at step 1006.

If no effects are to be applied to the video sequence (or after all desired effects have been applied), the methodology moves to step 1014, where a video output is generated (e.g., by rendering component 418 of FIG. 4) based on the video sequence defined in the editlist. In one or more embodiments, the editlist may be compiled (e.g., by compile component 414 of FIG. 4) to generate an executable video sequence that can be played using a suitable video playback application.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the video editing system described herein can be implemented in any computer system or environment having any number of memory or storage units (e.g., memory 314 of FIG. 3), and any number of applications and processes occurring across any number of storage units. This includes, but is not limited to, an environment with server computers and client computers deployed in a network environment or a distributed computing environment, having remote or local storage. For example, with reference to FIG. 3, interface component 304, editlist builder 306, compile component 308, and rendering component 310 can be stored on a single memory 314 associated with a single device, or can be distributed among multiple memories associated with respective multiple devices. Similarly, interface component 304, editlist builder 306, compile component 308, and rendering component 310 can be executed by a single processor 312, or by multiple distributed processors associated with multiple devices.

Distributed computing provides sharing of computer resources and services by communicative exchange among computing devices and systems. These resources and services include the exchange of information, cache storage and disk storage for objects, such as files, editlists, video sequences, etc. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 11:
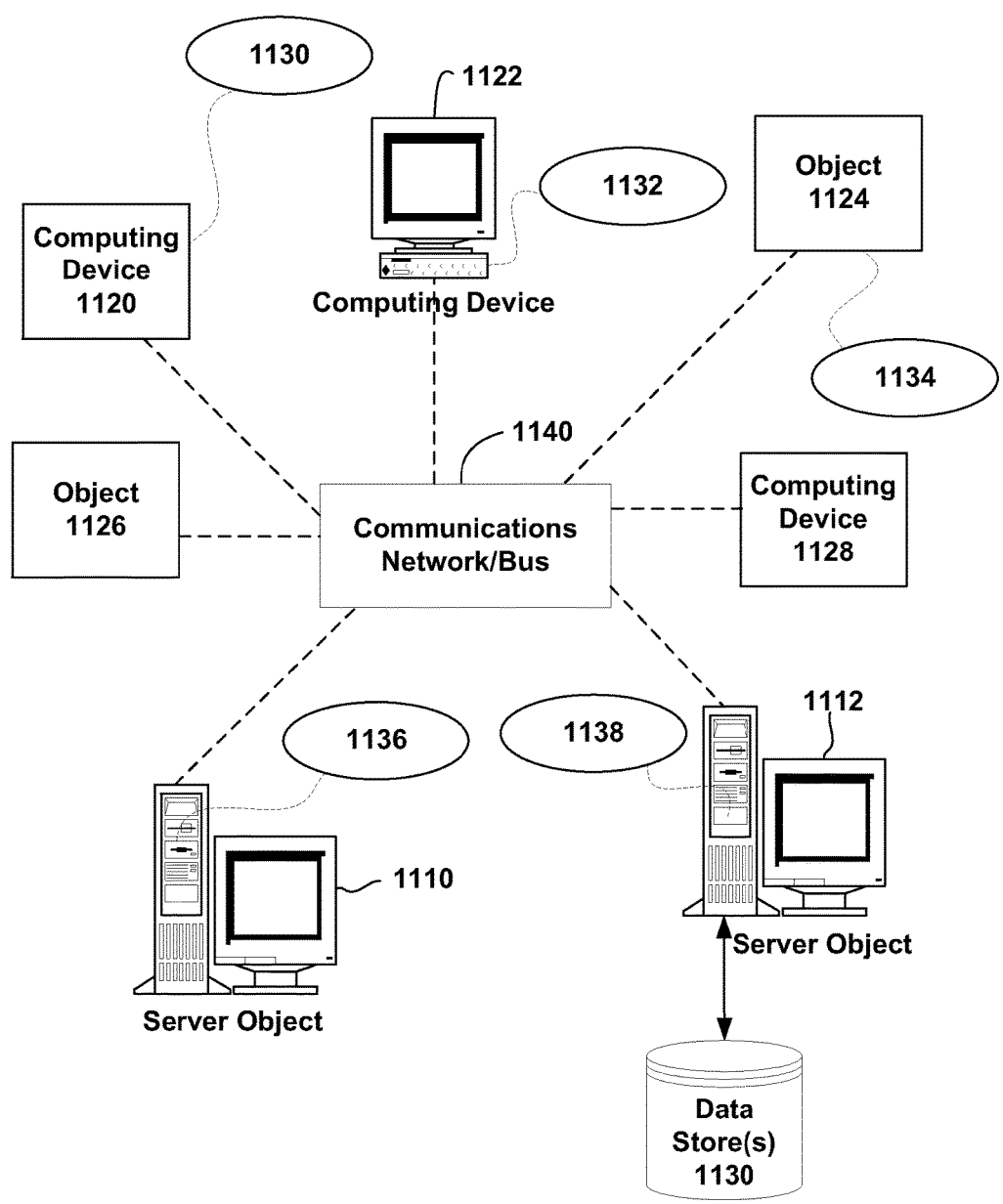
FIG. 11 is a block diagram representing an exemplary networked or distributed computing environment for implementing one or more embodiments described herein.

FIG. 11 provides a schematic diagram of an exemplary networked or distributed computing environment. The distributed computing environment includes computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, tablets, etc., where embodiments of the video editing system described herein may reside on or interact with such devices.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, communications network 1140 may comprise other computing objects and computing devices that provide services to the system of FIG. 11, and/or may represent multiple interconnected networks, which are not shown. Each computing object 1110, 1112, etc. or computing objects or devices 1120, 1122, 1124, 1126, 1128, etc. can also contain an application, such as applications 1130, 1132, 1134, 1136, 1138 (e.g., video editing system 302 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc. provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 is the Internet, for example, the computing objects 1110, 1112, etc. can be Web servers, file servers, media servers, etc. with which the client computing objects or devices 1120, 1122, 1124, 1126, 1128, etc. communicate via any of a number of known protocols, such as the hypertext transfer protocol (HTTP). Computing objects 1110, 1112, etc. may also serve as client computing objects or devices 1120, 1122, 1124, 1126, 1128, etc., as may be characteristic of a distributed computing environment.

Exemplary Computing Device

Figure 12:
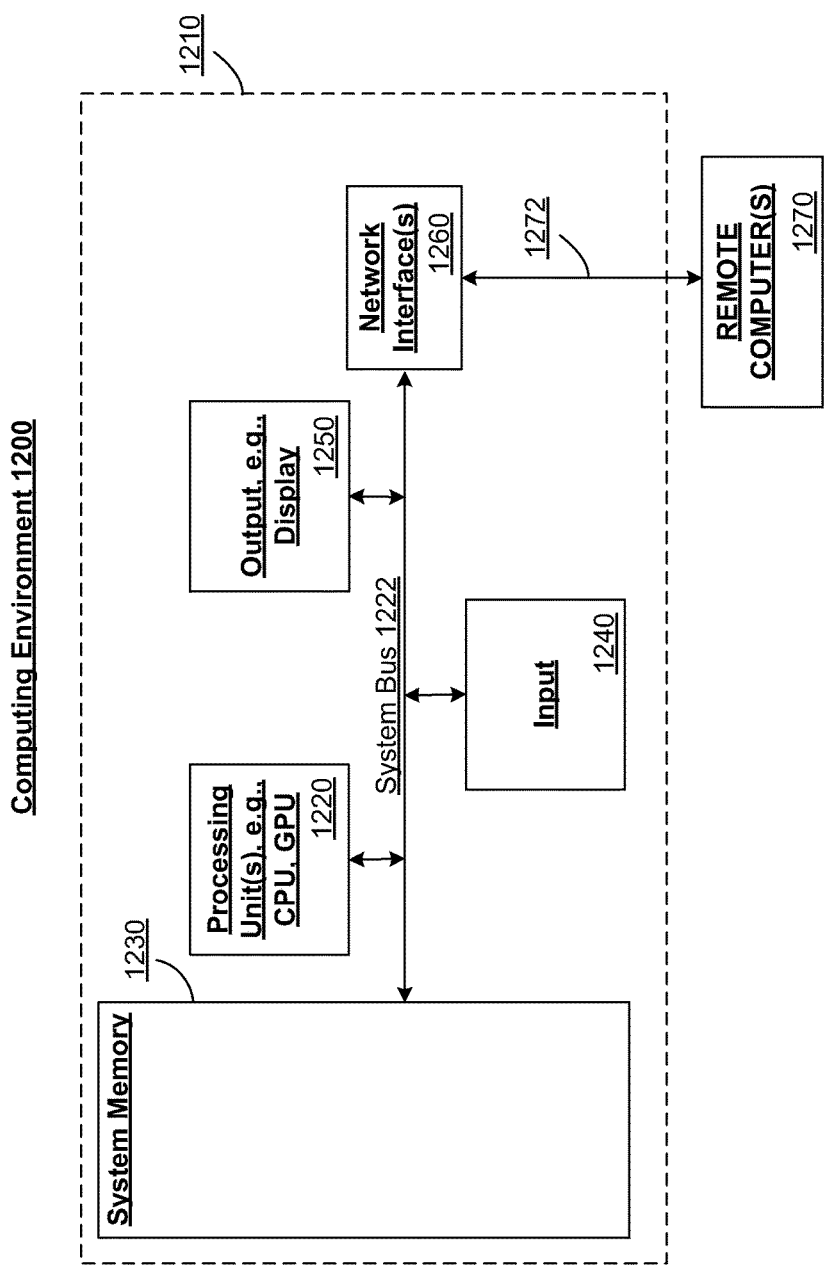
FIG. 12 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 12 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 12 thus illustrates an example of a suitable computing system environment 1200 in which one or aspects of the embodiments described herein can be implemented, although as made clear above, the computing system environment 1200 is only one example of a suitable computing environment and is not intended to suggest any limitation as to scope of use or functionality. Neither is the computing system environment 1200 be interpreted as having any dependency or requirement relating to any one or combination of components illustrated in the exemplary computing system environment 1200.

With reference to FIG. 12, an exemplary computing device for implementing one or more embodiments in the form of a computer 1210 is depicted. Components of computer 1210 may include, but are not limited to, a processing unit 1220, a system memory 1230, and a system bus 1222 that couples various system components including the system memory to the processing unit 1220. Processing unit 1220 may, for example, perform functions associated with processor(s) 312 of video editing system 302, while system memory 1230 may perform functions associated with memory 314.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data.

A user can enter commands and information into the computer 1210 through input devices 1240, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1210. A monitor or other type of display device is also connected to the system bus 1222 via an interface, such as output interface 1250. In addition to a monitor, computers can also include other peripheral output devices such as speakers and a printer, which may be connected through output interface 1250. In one or more embodiments, input devices 1240 can provide user input to interface component 304, while output interface 1250 can receive information relating to operations of video editing system 302 from interface component 304.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 314) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring audio segments), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures (e.g., FIGS. 9 and 10). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result.

Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method comprising:
    storing an intermediate video declaration list that includes only declarations of intermediate video objects, each declaration of an intermediate video object referencing a source video clip and specifying an effect to apply to the source video clip;
    generating an intermediate video object declared in the intermediate video declaration list by applying an effect specified in a declaration of the intermediate video object to a source video clip referenced in the declaration of the intermediate video object,
    storing a declaration of a video sequence of a plurality of video clips that is distinct from the intermediate video declaration list, the declaration of the video sequence including an ordered list of references to one or more media objects that lack an effect applied to the one or more media objects and a reference to at least a portion of the intermediate video object declared in the intermediate video declaration list; and
    generating the video sequence by sequentially including each of the media objects and the intermediate video object in the video sequence according to the ordering of each of the media objects and the intermediate video object in the ordered list, wherein a reference included in the declaration of the video sequence that is associated with at least one video clip from a pair of successive video clips in the video sequence is called a plurality of times to generate the video sequence, the pair of successive video clips corresponding to a portion of the generated video sequence.

2. The method of claim 1, wherein the declaration of the video sequence further specifies an effect to apply to one or more video clips included in the video sequence and the method further comprising:
    applying the effect to the one or more video clips included in the video sequence.

3. The method of claim 1, wherein the generating the intermediate video object comprises defining a set of video frames as the source video clip.

4. The method of claim 1, wherein the generating the intermediate video object comprises declaring an identifier for the intermediate video object.

5. The method of claim 4, further comprising configuring a reference object to reference the intermediate video object by the identifier.

6. The method of claim 5, further comprising:
    defining a time range for the reference object; and
    referencing a portion of the intermediate video object corresponding to the time range.

7. The method of claim 1, further comprising defining the effect to be at least one of: a stabilize operation, a crossfade transition, a cross-blur transition, a wipe transition, a slide transition, a grow transition, a shrink transition, a dissolve transition, an auto leveling operation, a contrast adjustment, a color adjustment or an image rotation.

8. A system for creating video clips, comprising:
    a memory that stores computer executable instructions; and
    a processor that executes the computer-executable instructions within the memory, the computer-executable instructions when executed by the processor cause the processor to perform steps comprising:
        storing a declaration of an intermediate video object that references a source video clip and specifying an effect to apply to the source video clip in its entirety;
        generating the intermediate video object by applying the effect specified in the declaration of the intermediate video object to the source video clip referenced in the declaration of the intermediate video object;
        storing a declaration of a video sequence of a plurality of video clips that is distinct from the declaration of the intermediate video object, the declaration of the video sequence of the plurality of video clips referencing an ordered list of media objects that lack an effect applied to the media objects and the intermediate video object; and
        generating the video sequence by sequentially including each of the media objects and the intermediate video object in the video sequence according to the ordering of each of the media objects and the intermediate video object in the ordered list, wherein a reference included in the declaration of the video sequence that is associated with at least one video clip from a pair of successive video clips in the video sequence is called a plurality of times to generate the video sequence, the pair of successive video clips corresponding to a portion of the generated video sequence.

9. The system of claim 8, wherein the declaration of the video sequence includes an identifier for the intermediate video object.

10. The system of claim 9, wherein a reference object included in the declaration of the video sequence includes the identifier for the intermediate video object and refers to a portion of the intermediate video object corresponding to a time range defined for the reference object.

11. The system of claim 8, wherein the effect further includes is at least one of: a cross-blur transition, a wipe transition, a slide transition, a grow transition, a shrink transition, a dissolve transition, an auto leveling operation, a contrast adjustment, a color adjustment or an image rotation.

12. A non-transitory computer-readable medium having stored thereon computer-executable instructions that, in response to execution, cause a computer system to perform operations, including:
    storing a declaration of an intermediate video object that references a source video clip and specifying an effect to apply to the source video clip;
    generating the intermediate video object by applying the effect specified in the declaration of the intermediate video object to the source video clip referenced in the declaration of the intermediate video object;
    storing a declaration of a video sequence of a plurality of video clips that is distinct from the declaration of the video object, the declaration of the video sequence referencing an ordered list of media objects that lack an effect applied to the media objects and the intermediate video object; and generating the video sequence by and sequentially including each of the media objects and the intermediate video object in the video sequence according to the ordering of each of the media objects and the intermediate video object in the ordered list, wherein a reference included in the declaration of the video sequence that is associated with at least one video clip from a pair of successive video clips in the video sequence is called a plurality of times to generate the video sequence, the pair of successive video clips corresponding to a portion of the generated video sequence.

13. The non-transitory computer-readable medium of claim 12, wherein the operations further comprise declaring an identifier for the intermediate video object.

14. The non-transitory computer-readable medium of claim 12, wherein the effect further comprises at least one of: a stabilize operation, a crossfade transition, a cross-blur transition, a wipe transition, a slide transition, a grow transition, a shrink transition, a dissolve transition, an auto leveling operation, a contrast adjustment, a color adjustment or an image rotation.

* * * * *